(12) United States Patent
Blond et al.

(10) Patent No.: US 10,328,969 B2
(45) Date of Patent: Jun. 25, 2019

(54) METHOD FOR OPTIMIZING THE STEERING ASSISTANCE

(71) Applicant: VOLVO TRUCK CORPORATION, Göteborg (SE)

(72) Inventors: Jean-Marc Blond, Saint Pierre de Chandieu (FR); Jérôme Chaudet, Sainte Julie (FR); Jean-Baptiste Doray, Chasse sur Rhone (FR); Olivier Villot, Saint Romain de Jalionas (FR)

(73) Assignee: Volvo Truck Corporation, Göteborg (SE)

( * ) Notice: Subject to any disclaimer, the term of this patent is extended or adjusted under 35 U.S.C. 154(b) by 17 days.

(21) Appl. No.: 15/566,265

(22) PCT Filed: Apr. 14, 2015

(86) PCT No.: PCT/IB2015/001458
§ 371 (c)(1),
(2) Date: Oct. 13, 2017

(87) PCT Pub. No.: WO2016/166567
PCT Pub. Date: Oct. 20, 2016

(65) Prior Publication Data
US 2018/0354551 A1     Dec. 13, 2018

(51) Int. Cl.
*B62D 5/04* (2006.01)
*B62D 5/30* (2006.01)
*G06F 19/00* (2018.01)

(52) U.S. Cl.
CPC ......... *B62D 5/0484* (2013.01); *B62D 5/0463* (2013.01); *B62D 5/0481* (2013.01); *B62D 5/30* (2013.01)

(58) Field of Classification Search
CPC ...... B62D 5/04; B62D 5/0481; B62D 5/0484; B62D 5/0489; B62D 5/30
USPC .......................................................... 701/43
See application file for complete search history.

(56) References Cited

U.S. PATENT DOCUMENTS

| 4,516,471 | A | 5/1985 | Duffy |
| 5,554,969 | A | 9/1996 | Eguchi |
| 7,913,803 | B2 * | 3/2011 | Hidaka ................ B62D 15/025 180/443 |
| 8,924,083 | B2 * | 12/2014 | Yoshitake .............. B62D 5/049 180/412 |
| 2002/0059021 | A1 | 5/2002 | Nishizaki et al. |
| 2003/0100981 | A1 * | 5/2003 | Suzuki .................. B62D 5/049 701/43 |
| 2008/0015749 | A1 | 1/2008 | Riepold et al. |
| 2009/0093931 | A1 | 4/2009 | Mizutani et al. |

(Continued)

FOREIGN PATENT DOCUMENTS

| DE | 102004049038 A1 | 4/2006 |
| EP | 1316493 A1 | 6/2003 |
| EP | 1468896 A2 | 10/2004 |

OTHER PUBLICATIONS

International Search Report (dated Jan. 7, 2016) for corresponding International App. PCT/IB2015/001458.

*Primary Examiner* — Tan Q Nguyen
(74) *Attorney, Agent, or Firm* — WRB-IP LLP

(57) ABSTRACT

A method and a system are provided for optimizing the steering assistance of a vehicle. The method includes the step of comparing the steering angle of the steered wheels with a theoretical value or with the steering angle of the steering wheel.

14 Claims, 3 Drawing Sheets

(56) References Cited

U.S. PATENT DOCUMENTS

| | | | |
|---|---|---|---|
| 2016/0101809 A1* | 4/2016 | Hong | B62D 5/0484 |
| | | | 701/43 |
| 2016/0200354 A1* | 7/2016 | Kimura | B62D 5/0472 |
| | | | 701/42 |

* cited by examiner

METHOD FOR OPTIMIZING THE STEERING ASSISTANCE

BACKGROUND AND SUMMARY

The present invention is directed to a method of optimizing the steering assistance of a motorized vehicle, using angle sensors instead of a torque detector. The method of the present invention also provides an improved steering power in case of failure. The present invention also encompasses a vehicle comprising two angle sensors used to optimize the steering assistance.

For utility vehicles, a steering assistance is necessary. It is usually provided through a torsion bar, which opens a hydraulic valve, according to the torque applied by the driver to the steering wheel. In case of failure of the hydraulic pump, or another part of the steering system, the effort to steer the steered axle considerably increases. In case such a failure occurs on an heavy truck, the driver becomes unable to steer the steerable wheels. It is therefore necessary to provide a backup steering system, which allows at least partial steering power. A back up steering system usually requires a second torsion bar, which is costly, heavy and space consuming. It is sometime not possible to implement such a second torsion bar on the steering column. DE102004049038 describes the use of two angle sensors to record the data resulting from the torsion of the torsion bar. However, DE102004049038 is not directed to backup steering systems.

It is therefore desirable to provide a method of optimizing the steering assistance with a costly efficient and space saving solution.

The steering system of an aspect of the present invention comprises one torsion bar and two angle sensors. The first angle sensor is positioned upstream the torsion bar and the second angle sensor is positioned downstream the torsion bar, in such a way that the torsion angle of the torsion bar can be monitored by the means of the two angle sensors. The portion of the steering column which is upstream the torsion bar comprises all the mechanical elements between the steering wheel and the part just above the torsion bar. It encompasses for example the upper shaft, the lower shaft, with inner shaft and outer shaft, a steering wheel adjustment device. The portion of the steering column which is downstream the torsion bar encompasses all the elements between the torsion bar and the steered wheels. This part comprises for example the drop arm, ball joints, drag link, the upper steering arm, the track rod. In case of twin steered axles, the portion which is downstream the torsion bar also encompasses the elements involved in the steering of the second steered axle. In particular, the second steering pump, the steering actuator of the second steered axle, and the secondary steering rod are downstream the torsion bar.

In a first embodiment, the angle sensors are used to detect an abnormal increase of angle between the first and the second angle sensor.

The method of the present invention comprises the steps of
a) Monitoring the steering angle of the steering wheel, by the means of a first angle sensor;
b) Monitoring the steering angle of the steered wheels, by the means of a second angle sensor;
c) Comparing the difference between the steering angle of the steering wheel, monitored is step a), and the steering angle of the steered wheels, monitored in step b), with a first reference value and/or comparing the steering angle of the steered wheels, monitored in step b), with a second reference value;
d) Detecting whether the difference between the steering angle of the steering wheel monitored in step a) and the steering angle of the steered wheels monitored in step b) reaches the first reference value of step c) and/or whether;
e) If the difference between the steering angle of the steeling wheel monitored in step a) and the steering angle of the steered wheels monitored in step b) reaches the first reference value of step c) and/or the steering angle of the steered wheels, monitored in step b) differs from the second reference value of step c), then activating a failure mode.

In step a), the angle to which the driver steers the steering wheel is determined by the means of the first angle sensor, positioned upstream the torsion bar. Each angle of rotation of the steering wheel may be associated or not associated to a theoretical angle of rotation of the steered wheels. The theoretical angle of rotation of the steered wheel is the angle expected for a given steering angle of the steering wheel. It may be for example a linear function of the steering angle of the steering wheel. Alternatively, the theoretical angle of the steered wheels may be a non-linear function of the angle of rotation of the steering wheel. The first angle sensor is preferably an angle sensor already present on the vehicle and involved in other functions. For example, the first angle sensor may be the angle sensor already used for the ESP functions.

In step b), the effective steering angle of the steerable wheels is determined by the means of a second angle sensor, positioned downstream the torsion bar. This second angle sensor is preferably positioned close to the torsion bar, on the output shaft of the steering gear, in order to provide a direct measurement. However, the second angle sensor may be positioned anywhere else downstream the torsion bar. In case of twin steered axles, the second angle sensor is preferably positioned on the first steered axle. The second angle sensor is preferably an angle sensor already present in the vehicle and involved in other functions. Indeed, an angle sensor may already be present for the steering management of the second steered axle. In this case, there is no need for additional specific sensors.

Step a) is concomitant with step b). This means that the steering angle of the steering wheel, is determined in step a) at the same time the steering angle of the steered wheels is determined in step b). Monitoring the steering angles in steps a) and b), or the difference of angles, has to be understood as repeating the operation of determining the steering angles, either permanently or as soon as one of the steering angles is modified. Permanently determining the steering angles means that a regular measurement is performed, for example at a predetermined frequency. Preferably, the steering angle is determined each few milliseconds, most preferably between 1 and 10 milliseconds.

In step c), the difference between the steering angle of the steering wheel and the steering angle of the steered wheels is monitored and compared to a predetermined value, which is a first reference value, or a warning threshold value, under which should remain the difference of steering angles. If a theoretical value is associated to the steering angle of the steering wheel in step a), the effective steering angle of the steered wheels, measured in step b), may also be monitored and compared to this theoretical value, which is a second reference value. Under normal conditions, the effective steering angle of the steered wheels should correspond to the second reference value. Also, under normal conditions, the difference of the steering angles determined in steps a and b)

should remain under the first reference value. Under these circumstances, it is considered that the suitable steering assistance is delivered, allowing effective steering of the steered wheels. No additional steering power is triggered.

In step d), it is identified that the difference of the steering angles, reaches the first reference value or the effective steering angle of the steering wheels departs from the second reference value. Under these conditions, it is considered that the steering system is in fault and step e) is initiated. Alternatively, step e) may be initiated if the two conditions of step b) are reached. In this case, step e) is initiated only when the difference of the steering angles reaches the first reference value and the effective steering angle of the steering wheels departs from the second reference value.

Step e) triggers a failure mode, wherein additional power steering is delivered to compensate the efforts of the driver. The failure mode may be the activation of an auxiliary steering power. In case of more than one steered axle, the failure mode may be a special mode of the steering system of the second steered axle. For example, under failure mode, the steering system of the second steered axle may be activated in a way to provide an oversteering of the second steered axle. The failure mode may encompass any other action which aims at improving the steering assistance.

DETAILED DESCRIPTION

Figure 1:
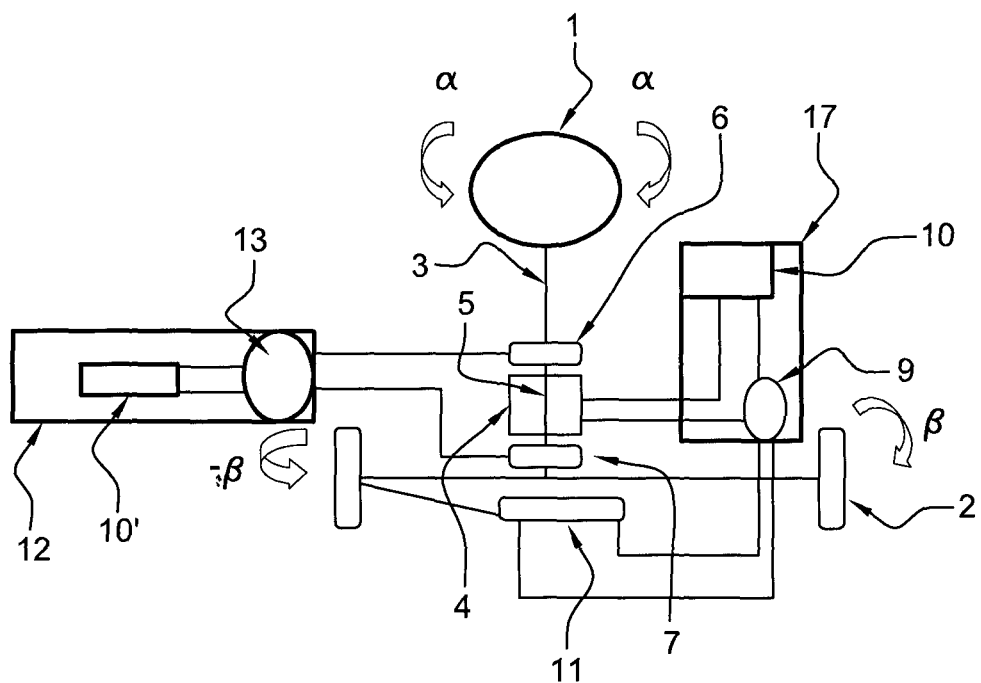
FIG. 1: vehicle having one steered axle 2, a fist steering system 17 and an auxiliary steering system 12.
Figure 2:
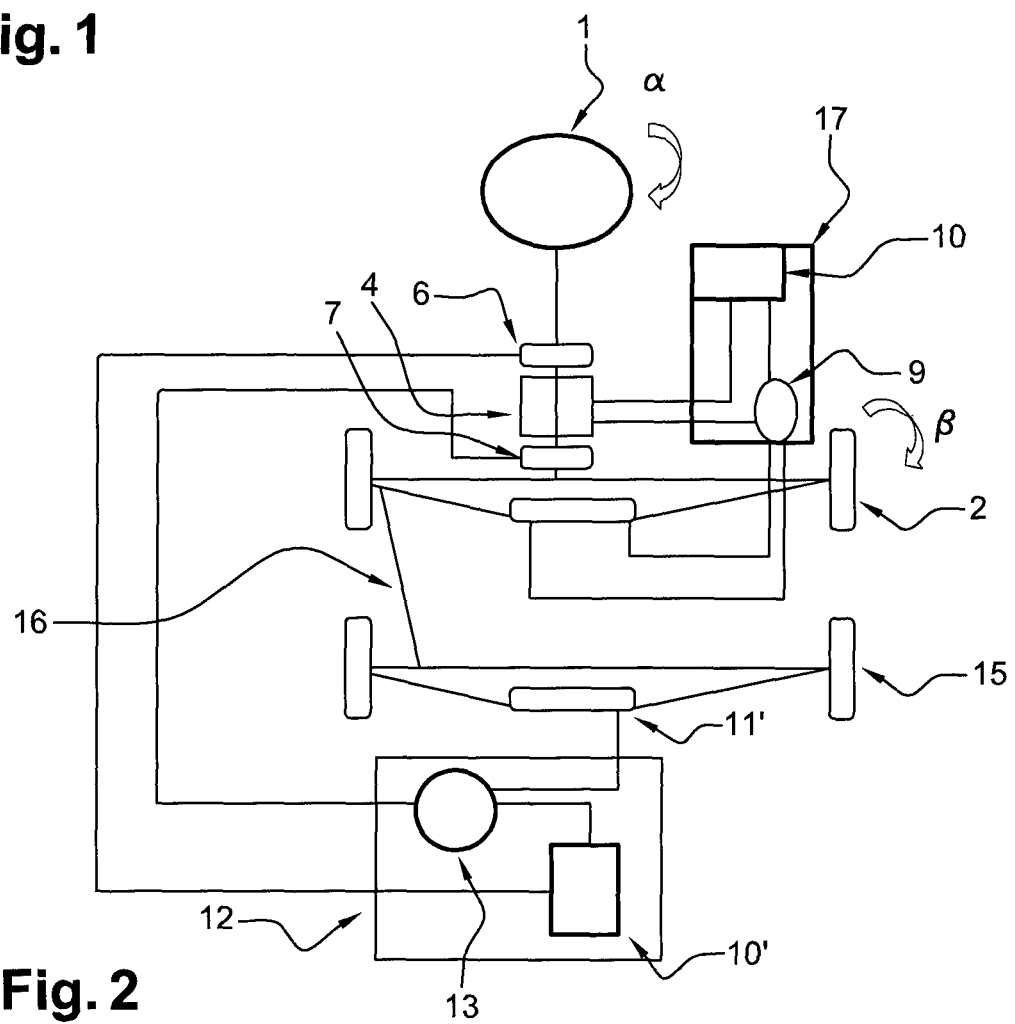
FIG. 2: vehicle having more than one steered axles, a fist steering system 17 and an auxiliary steering system 12

The present arrangement used for optimizing the steering assistance of a vehicle, comprises a first steering system 17, and an auxiliary steering system 12. The first steering system 17 comprises a first hydraulic pump 9 and a first reservoir 10, connected to the first pump 9. The auxiliary steering system 12 comprises a second hydraulic pump 13 and a second hydraulic reservoir 10'. Alternatively, the auxiliary steering system 12 comprises one or more electrical motors able to steer the steerable wheels 2, 15.

The steering arrangement of the present invention also comprises a steering wheel 1, connected to steerable wheels 2 through a steering column 3 and a steering box 4. The steering box 4 contains a torsion bar 5, adapted to open a rotary valve 8 (not shown) according to the torque applied by the driver to the steering wheel 1. The rotary valve 8 is in fluidic communication with a first pump 9, which is connected to a first hydraulic reservoir 10. The opening of the rotary valve 8 by the steering torque applied by the driver on the steering wheel 1 initiates a fluid pressure to an actuator 11 which provides the suitable steering power to the steered wheels 2, 15. The steering arrangement of the invention further comprises a first angle sensor 6, upstream to the torsion bar 5, and a second angle sensor 7 downstream to the torsion bar 5. The first angle sensor 6 allows to determine the angle of rotation $\alpha$ of the steering wheel, induced by the driver. The first angle sensor 6 also allows to determine the direction in which the driver steers the steering wheel 1, either to his left or to his right. By convention, it cat be determined that a clockwise rotation of the steering wheel 1 corresponds to a positive steering, angle $\alpha$, and that an anti-clockwise rotation of the steering wheel 1, corresponds to a negative steering angle $-\alpha$.

The second angle sensor 7 allows to determine the effective steering angle $\beta$ of the steered wheels 2, The second angle sensor 7 also allows to determine the direction in which the steered wheels 2 are steered, either to the left, or to the right. By convention, it can be determined that a rotation of the wheels 2 to the right corresponds to a positive steering angle $\beta$, and rotation to the wheels 2 to the left corresponds to a negative steering angle $-\beta$. The first angle sensor 6 and the second angle sensor 7 are connected to the auxiliary steering system 12. The auxiliary steering system 12 comprises a second hydraulic pump 13, connected to a second hydraulic reservoir 10' and able to activate the steering actuator 11. Alternatively, the auxiliary pump 13 of the auxiliary steering system 12 may be connected to the first reservoir 10. Alternatively, the auxiliary steering system 12 may comprise an electrical motor 14 connected to the steerable wheels 2, 15.

In case more than one axle is steered, meaning that the vehicle comprises a first set of steered wheels 2 and one or more secondary set of steered wheels 15, the auxiliary system 12 may be the steering assembly regularly involved in the steering of the secondary set of wheels 15. In case of failure of the first steering system 17, the auxiliary steering system 12 can adopt a failure mode, adapted to compensate the failure of the first steering system 17, at least partly. A failure mode may comprise for example an over steering of the secondary steerable set of wheels 15 by the means of the secondary actuator 11'.

Figure 3:
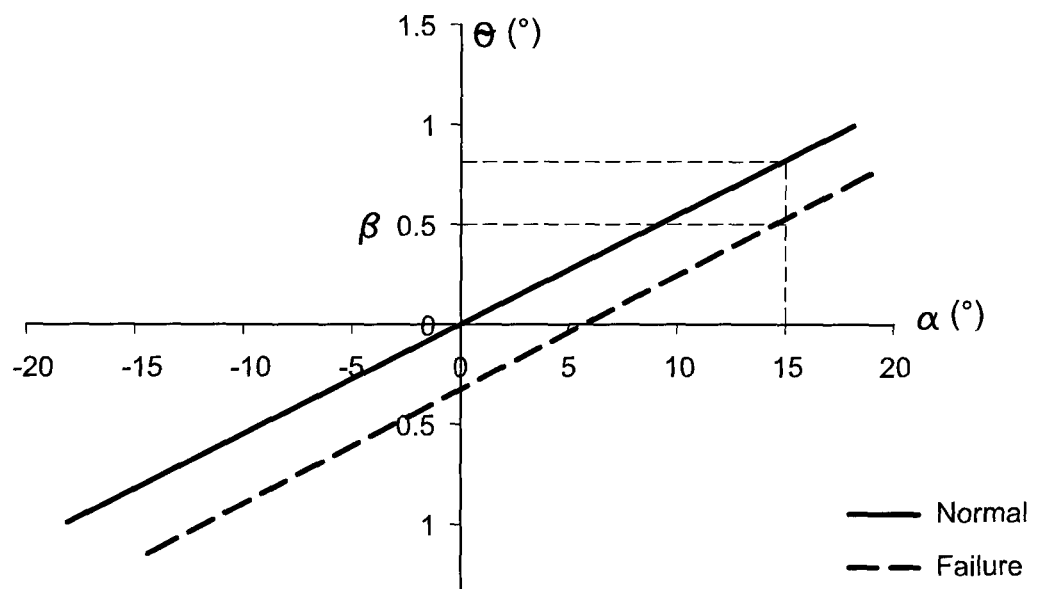
FIG. 3: diagram showing a failure mode activation.
Figure 4:
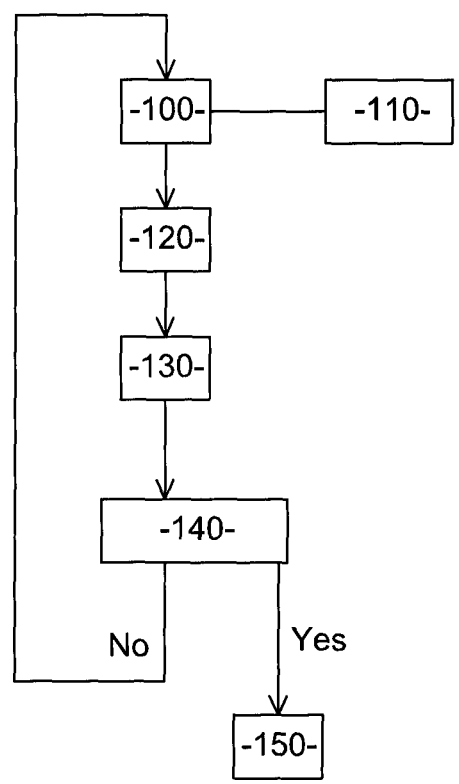
FIG. 4: diagram showing step a), 100, including 110, step b) 120, step c) 130, step d) 140 and step e) 150.

In the method of the present invention, step a) 100 allows to monitor the steering angle $\alpha$ of the steering wheel 1. Step a) 100 also encompasses the determination of the direction in which is steered the steering wheel 1 by the driver. Step a) may also comprise, but this is not mandatory, the determination of a theoretical steering angle $\theta$ 110 of the steered wheels 2, corresponding to the steering angle $\alpha$ of the steering wheel 1, as shown in FIG. 3. FIG. 3 shows an example wherein the theoretical value $\theta$ is determined according to the steering angle $\alpha$ of the steering wheel 1. However, other relationship between the angle $\alpha$ and the expected steering angle $\theta$ of the steered wheels 2 may be determined. The steering angle $\alpha$ is permanently monitored.

In step b) 120, the effective steering angle $\beta$ is determined, by the means of the second angle sensor 7. In step b) 120 the steering angle $\beta$ permanently monitored in the same time than the steering angle $\alpha$.

In step c) 130, the effective steering angle $\beta$ is compared to the theoretical value $\theta$ if this value has been determined in step a). In case $\beta$ corresponds to the expected value $\theta$, then it is considered than no failure of the first steering system 17 occurs. In order to determine that no failure occurs, it may be considered that $\beta=\theta$, or that $\beta$ is close enough to $\theta$. Close enough has to be understood in a sense where $\beta$ is not different from $\theta$ by a certain amount. For example, it can be determined that no failure occurs if $\beta$ does not differ from $\theta$ by more than around 5% or 10%. Alternatively, it can be determined that no failure occurs if $\beta$ does not differ from $\theta$ by more than around 0.1°, 0.5°, 3°, 5° or 10°. FIG. 3 shows an example wherein, for a given steering angle $\alpha$ of the steering wheel 1, the theoretical value $\theta$ is around 0.7° and the effective steering angle $\beta$, determined by the second angle sensor 7, is around 0.5°, in that case, it may be determined that, differs from the theoretical value θ by more than 10%, and thus that a failure occurs in the first steering system 17.

In case the effective steering angle β of the wheels 2 is different from the theoretical value θ, or significantly different from θ, by a certain amount of more than 5% or 10%, or of more than 0.1°, 05°, 1°, 3°, 5° or 10°, then it is determined in step d) 140 that a failure of the first steering system 17 occurs. A failure is preferably identified when the effective steering angle β is inferior to the theoretical value θ. This means that the wheels 2 are not steered, or not steered enough, while the driver is acting on the steering wheel 1. Preferably, a failure is identified when the effective steering angle β is inferior to the theoretical value θ, by an amount of around 0.1°, 05° or around 5°. Alternatively, a failure is identified when the effective steering angle β is inferior the theoretical value θ, by an amount of around 5%, or around 10%.

Such a difference between the theoretical value θ and the effective steering angle β can occur temporarily. This can be the case when the driver rapidly steers the steering wheel 1 while the hydraulic pump 13 is miming slowly This situation does not correspond to a failure of the system. It may be considered that a failure mode is anyway activated in step e) 150 to supply the requested additional steering power. Alternatively, step e) may be initiated only after a certain time after the difference between the theoretical value θ and the effective steering angle β, has been determined in step d). For example, the failure mode may be initiated few milliseconds after the difference between the theoretical value θ and the effective steering angle β has been detected. Few milliseconds can be understood as of a delay, of around 5 to 10 milliseconds. Alternatively, a delay of around 20 to 50 milliseconds can be applied before initiating a failure mode. In some specific application, a longer delay may be applied, like 1 or 2 seconds.

Once the failure is identified in step d), then any actions aiming at providing further steering assistance may be triggered in step e). For example, step e) may comprise the activation of an auxiliary steering pump 13, or an auxiliary steering electrical motor 14, which provides further steering assistance to the driver. In case of twin steering axles, or several steering axles, step e) may comprise the over activation of the auxiliary steering system 12, regularly used in the steering of the secondary set of steered wheels 15, in such a way to overcome the failure of the first steering system 17.

Figure 5:
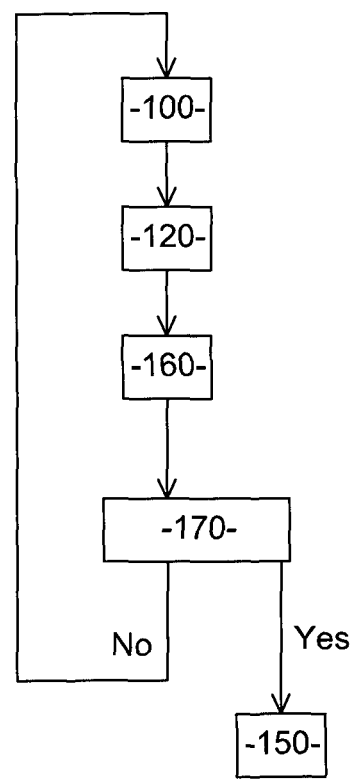
FIG. 5: diagram showing step a) 100, step b) 120, step c') 160, step d') 170 and step e) 150.

FIG. 5 illustrates the case where no theoretical value θ is associated to the steering angle α of the steering wheel 1 measured in step a) 100. The difference between the steering angle α of the steering wheel 1 and the steering angle β of the steered wheels 2 is measured in step b) 120. The difference between the steering angle α of the steering wheel 1 and the steering angle β of the steered wheels 2 is monitored in step c') 160 and compared to a predetermined reference value in step d') 170. Said predetermined reference value can be for example 0.1°, 0.5°, 1°, 5°, 10°, or 20°. As long as the first hydraulic pump 13 delivers the proper steering assistance, the difference between the steering angles α, and the steering angle β, remains under the reference value.

In case of failure of the first steering system 17, the driver applies an increasing torque on the steering wheel 1, which increases the difference between the steering angle α, and the steering angle β. If it is determined in steps d') 170 and c') 160 that the difference between the steering angles α and the steering angle β reaches the predetermined reference value, then step e) 150 is initiated. For the same reasons as above mentioned, it can be envisaged that a delay is applied before step e) is initiated. For example a delay of few milliseconds can be applied from the time when it is detected that the difference between the steering angle α and the steering angle β has reached the predetermined reference value. A delay of around 5 to 10 milliseconds is envisaged. Alternatively, a delay of 20 to 50 milliseconds may be applied. Longer delays may be applied according to specific needs.

In step e) 150, the auxiliary system 12 may be activated to provide the suitable additional steering power assistance. Alternatively, if the auxiliary system 12 regularly delivers a portion of the total steering power in parallel to the first steering system 17, then in step e) the auxiliary steering system 12 may be over activated in such a way to compensate the default of the first steering system 17. In case, the auxiliary steering system 12 is connected to a secondary steerable set of wheels 15, then a failure mode triggered in step e) may be an oversteering of the secondary set of steered wheels 15.

Figure 6:
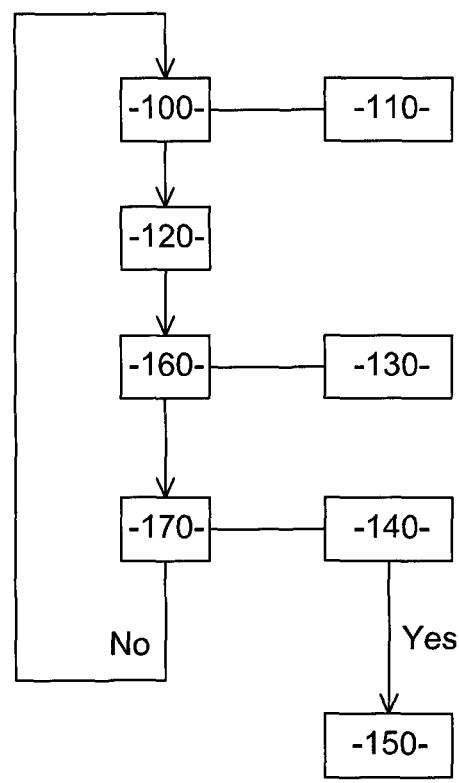
FIG. 6: diagram showing step a) 100, including 110, step b) 120, step c") 130 and 160, step d") 140 and 170, and step e) 150.

The method of the present invention may also consolidate the measurements of the steering angles before initiating a failure mode, as shown in FIG. 6. In that case, the method may comprise the following steps:

a) Monitoring the steering angle α of the steering wheel 1, 100, by the means of a first angle sensor 6, wherein a theoretical value θ is associated to said steering angle α, 110;

b) Monitoring the steering angle β of the steered wheels 2, by the means of a second angle sensor 7, 120;

c") Monitoring the difference between the steering angle α measured in step a) and the steering angle β measured in step b), 160 and comparing this difference with a first reference value, and comparing the steering angle β measured in step b) with a second reference value θ 130, wherein θ corresponds to a theoretical value associated to the steering angle α measured in step a) 110;

d") Detecting whether the difference between the steering angle α measured in step a) and the steering angle β measured in step b) reaches the first reference value 170 and detecting whether the measured steering angle β differs from the second reference value θ 140;

e) Initiating a failure mode if in step d") the difference between the steering angle α measured in step a) and the steering angle β measured in step, b) reaches the first reference value, or if in step d") the measured steering angle β differs from the second reference value θ;

Alternatively, step e) may be replaced by step f) as follows:

a) Initiating a failure mode if in step d") the difference between the steering angle α measured in step a) and the steering angle β measured in step b) reaches the first reference value, and if in step d") the measured steering angle β differs from the second reference value θ.

For the same reason as above-mentioned, a certain delay may be applied before step f) is initiated. It may be for instance considered that step f) is initiated only after a certain time after both conditions of step b) are verified, meaning that the difference between the steering angle α and the steering angle β measured in step b) reaches the first reference value, and the steering angle β differs from the second reference value θ. A delay of around 5 to 10 milliseconds may be envisaged. Alternatively, a delay of 20 to 50 milliseconds may be applied. Longer delays may be applied according to specific needs.

The present invention also encompasses the method wherein the auxiliary steering system 12 regularly provides a certain amount of the steering power, even under normal conditions. For example, in case of one steering set of wheels 2, the auxiliary steering system 12 may deliver one half or one third of the total energy requested to steer the wheels 2, in order to minimize the energy consumption of the first steering system 17. When one or both of the conditions of step d) are satisfied, then, the auxiliary steering system 12 adopts the failure mode in step e), or is step f) and provides the full amount of the energy necessary to steer the steered wheels 2. This arrangement may be particularly advantageous in case the auxiliary steering system 12 comprises one or more electrical motors.

The same applies for a vehicle comprising on or more secondary steered set of wheels 15. The auxiliary steering system 12, directed to the steering of the secondary steerable axle 15, may be entirely independent from the first steering system 17. The steering power of the auxiliary steering system 12 is provided according to the steering angles measured by the first angle sensors 6 and the second angle sensor 7. As long as the difference between the steering angles α and β remain under the first reference value, and/or as long as the effective steering angle β does not differ from the second reference value θ, then the auxiliary steering system 12 delivers a certain amount of steering power and/or a certain steering amplitude. Then, in case a failure mode is initiated in step e) or is step f), then the auxiliary steering system 12 may deliver more steering power and/or an amplified range of steering angles, in order to compensate the failure of the first steering system 17. The method of the present invention allows to manage the steering of the secondary set of wheels 15 in the absence of the secondary rod 16, which links the first steered wheels 2 with the secondary steered set of wheels 15.

It is also desirable to provide a system or an arrangement for optimizing the steering assistance of a vehicle comprising a first steering system 17, an auxiliary steering system 12, a steering gear 4 with a torsion bar 5, a first angle sensor 6 placed upstream the torsion bar 5, and a second angle sensor 7 placed downstream the torsion bar 5, and an auxiliary steering system 12, characterized in that the auxiliary steering system 12 is connected to the first angle sensor 6 and the second angle sensor 7 and that it is activated or overactivated when the difference between the steering angle α measured by the first angle sensor 6 and the steering angle β measured by the second angle sensor 7 reaches a first reference value, or when the steering angle β measured by the second angle sensor 7 differs from a second reference value θ.

The present invention also, encompasses, according to an aspect thereof, a vehicle with at least one steered axle 2, a first steering system 17, an auxiliary steering system 12, wherein the auxiliary steering system 12 is activated or overactivated according to the method above-described.

The invention claimed is:

1. Method for optimizing the steering assistance of a vehicle comprising at least a first and a second steered set of wheels, a steering gear with a torsion bar, a first angle sensor placed upstream the torsion bar of the steering gear, and a second angle sensor placed downstream the torsion bar, the method comprising:
   a) Monitoring the steering angle α of a steering wheel using the first angle sensor;
   b) Monitoring the steering angle β of the second steered set of wheels using the second angle sensor;
   c) Monitoring a difference between the steering angle α measured in step a) and the steering angle β measured in step b), and comparing the difference with a first reference value;
   d) Detecting whether the difference between the steering angle α measured in step a) and the steering angle β measured in step b) reaches a first reference value;
   e) Initiating a failure mode when in step d) the difference between the steering angle α measured in step a) and the steering angle β measured in step b) reaches the first reference value,
   wherein the failure mode initiated in step e) corresponds to an over-steering of the second steered set of wheels.

2. Method according to claim 1 wherein step a) further comprises associating a theoretical value θ corresponding to a theoretical steering angle of the steered wheels associated with the steering angle α.

3. Method according to claim 2, wherein step c) further comprises comparing the steering angle β, measured in step b) with the theoretical value θ.

4. Method according to claim 2, wherein step d) further comprises detecting whether the measured steering angle β differs from the theoretical value θ.

5. Method according to claim 2, wherein the failure mode is initiated in step e) if in step d) the difference between the steering angle α measured in step a) and the steering angle β measured in step b) reaches the first reference value, or if in step d) the measured steering angle β differs from the theoretical value θ.

6. Method according to claim 2, wherein the failure mode is initiated in step e) if in step d) the difference between the steering angle α measured in step a) and the steering angle β measured in step b) reaches the first reference value, and if in step d) the measured steering angle β differs from the theoretical value θ.

7. Method according to claim 1, wherein the first angle sensor is used for an electronic stability program (ESP).

8. Method according to claim 1, wherein the second angle sensor is a sensor use in the control of the steering of the secondary steered set of wheels.

9. Method according to claim 1, wherein the failure mode in step e) is initiated after a predetermined amount of time after one of the conditions of step d) is detected.

10. Method according to claim 1, wherein the failure mode is initiated after a predetermined amount of time after both conditions of step d) are verified.

11. System for optimizing the steering assistance in a vehicle comprising
   a first steering system,
   a torsion bar,
   first and second sets of steered wheels,
   a first angle sensor placed upstream the torsion bar,
   a second angle sensor placed downstream the torsion bar, and
   an auxiliary steering system,
   wherein the auxiliary steering system is connected to the first angle sensor and the second angle sensor and is activated or overactivated when a difference between a steering angle α of a steering wheel measured by the first angle sensor and a steering angle β of the second set of steered wheels measured by the second angle sensor reaches a predetermined first reference value, wherein the auxiliary steering system is a steering system of the second set of steered wheels.

12. System according to claim 11, wherein the auxiliary steering system is activated or overactivated when the steering angle β measured by the second angle sensor differs from a second reference value θ, the second reference value θ being a theoretical value for the second steered set of wheels corresponding to the steering angle of the steering wheel.

13. System according to claim 11, wherein the first angle sensor is used for an electronic stability program (ESP).

14. A vehicle equipped with the system as described in claim 11.

\* \* \* \* \*